FIG. I

Jan. 24, 1961 W. S. GUBELMANN 2,969,181
KEYBOARD DECIMAL MARKERS AND THE LIKE
Filed May 27, 1957 5 Sheets-Sheet 3

INVENTOR
William S. Gubelmann

Jan. 24, 1961 W. S. GUBELMANN 2,969,181
KEYBOARD DECIMAL MARKERS AND THE LIKE
Filed May 27, 1957 5 Sheets-Sheet 4

INVENTOR
William S. Gubelmann

Jan. 24, 1961  W. S. GUBELMANN  2,969,181
KEYBOARD DECIMAL MARKERS AND THE LIKE
Filed May 27, 1957  5 Sheets-Sheet 5

INVENTOR
William S. Gubelmann

United States Patent Office 2,969,181
Patented Jan. 24, 1961

2,969,181

KEYBOARD DECIMAL MARKERS AND THE LIKE

William S. Gubelmann, Convent, N.J., assignor to Realty and Industrial Corporation, Convent, N.J., a corporation of New Jersey Filed May 27, 1957, Ser. No. 661,971

11 Claims. (Cl. 235—145)

This invention relates to calculating machines, or the like.

An object of this invention is to provide an improvement in a computing machine of the type that has several registers in an ordinally shiftable carriage and also has several banks of digital keys for entering certain factors of a computation, and including elements for selectively indicating the location of a reference point such as a decimal, or other delineations, between adjacent orders of such registers and banks of keys.

Another object of the invention is to provide means for minimizing the subjective influence of the operator over sequence when following the prescribed mode of decimalizing operation steps.

It is an object of this invention to provide an improved reference or decimal marker on top of a keyboard background wall intermediate rows or banks of digit keys, the marker having more than two faces of which only one face at a time is visible as for representing a decimal when a face of a surface differing from that of the background is visible.

The foregoing and other objects and advantages of the invention will be more readily understood upon reference to the following description. It will be apparent, however, that those skilled in the art will be enabled to apply the teachings of this disclosure to various modifications as intended to be covered by the scope of the appended claims. The description is directed to a preferred exemplary embodiment of the invention illustrated in the accompanying drawings forming a part hereof, in which:

This application is a continuation-in-part of my copending application, Serial No. 194,273, filed November 6, 1950, for a Calculating Machine.

*Decimal markers*

Figure 1:
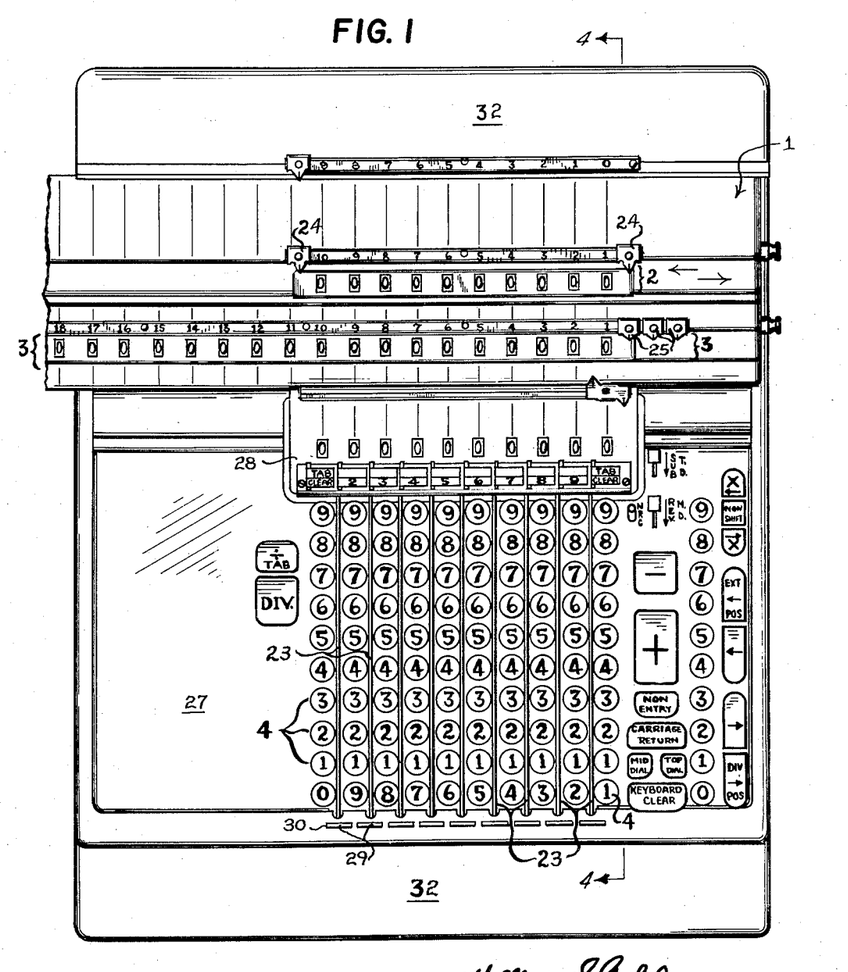
Figure 1 is a top face view of a calculating machine according to the invention, the carriage being shown in fragment in its leftmost position.

Selectively settable decimal marker members 23 (Fig. 1), 24 and 25 are provided for indicating decimals of factors set up by keys 4 and of registrations in registers 2 and 3 respectively.

Markers 23 in one form are elongated prismatic bars, the degree of elongation being made sufficient to suit the constructional needs and arrangements. Each bar is formed with more than two faces about its longitudinal axis, this being the axis about which it is mounted for turning. A bar 23 is disposed intermediate each adjacent bank of keys 4, there being nine such bars shown by way of example. In a preferred form of the invention, no marker bar 23 is illustrated to the left of the left-most bank of keys 4 and likewise none is illustrated to the right of the right-most bank, but, according to another form, such a bar could be placed in each of these positions for use as in division, addition, subtraction and multiplication, within the spirit and scope of the invention. These bar markers are rotatably mounted at their forward or proximal ends on upturned flange 26 (Figs. 4 and 7) of keyboard frame plate 27, and at their rearward ends on keyboard register cover plate 28 which is supported by plate 27. According to one preferred form, markers 23 are triangular in cross section, each normally having only one of its three faces visible to the operator, the face then being in a plane parallel with the plane of plate 27 which serves as the background for the keyboard, as viewed in Fig. 1.

Slightly rearwardly of flange 26 (Fig. 4) a turning means 29 is secured to each bar 23 for movement therewith. Each turning means protrudes upwardly through suitably located frame openings 30 on the over-hanging portion 31 of cover plate 32, which is in front of keys 4. This location is not only convenient for the operator but also avoids interference with or accidental depression of keys 4 while manipulating a turning means for rotating a selected bar marker so as to bring any one of its three faces into direct line of vision of the operator.

By using a bar that is triangular in cross section, the need for obscuring the faces not in parallel plane with the background plate is eliminated. When a face of such a bar is in normal viewing position, parallel to plate 27, the other faces of the bar are automatically out of view.

In one preferred form, the surface of one face of each bar 23 matches the visible surface of the background plate 27 so as to blend or merge therewith and thus be indistinguishable therefrom when brought into viewing position, thereby avoiding the representation of a decimal or of any other delineation. Each of the other two faces of the bars may be surfaced mutually similarly but differently from that of the background surface, or the two faces may be surfaced differently from each other and from the background plate or wall. Then when one of the differently surfaced faces of a bar is turned into viewing position it contrasts with the background, distinctly delineating the adjacent banks of keys, whereby to represent a decimal, a point, line or location of demarcation.

The surfaces may be formed on, applied to or secured to, the bar faces and the background plate by any convenient method. In order to obtain surfaces for matching and contrasting purposes, use may be made of such expedients, among others, of polishing, plating, surface graining, differential scoring or suitable facings such as, for example, layers of colored material.

According to another construction, any one or more faces of a bar may be selectively provided with single or repeated symbols, for example, "£" to indicate "pounds," "s," for "shillings" and "d," for "pence," where a bar has only three viewing faces, then all three would have delineating markings.

Figures 4, 5, 6:
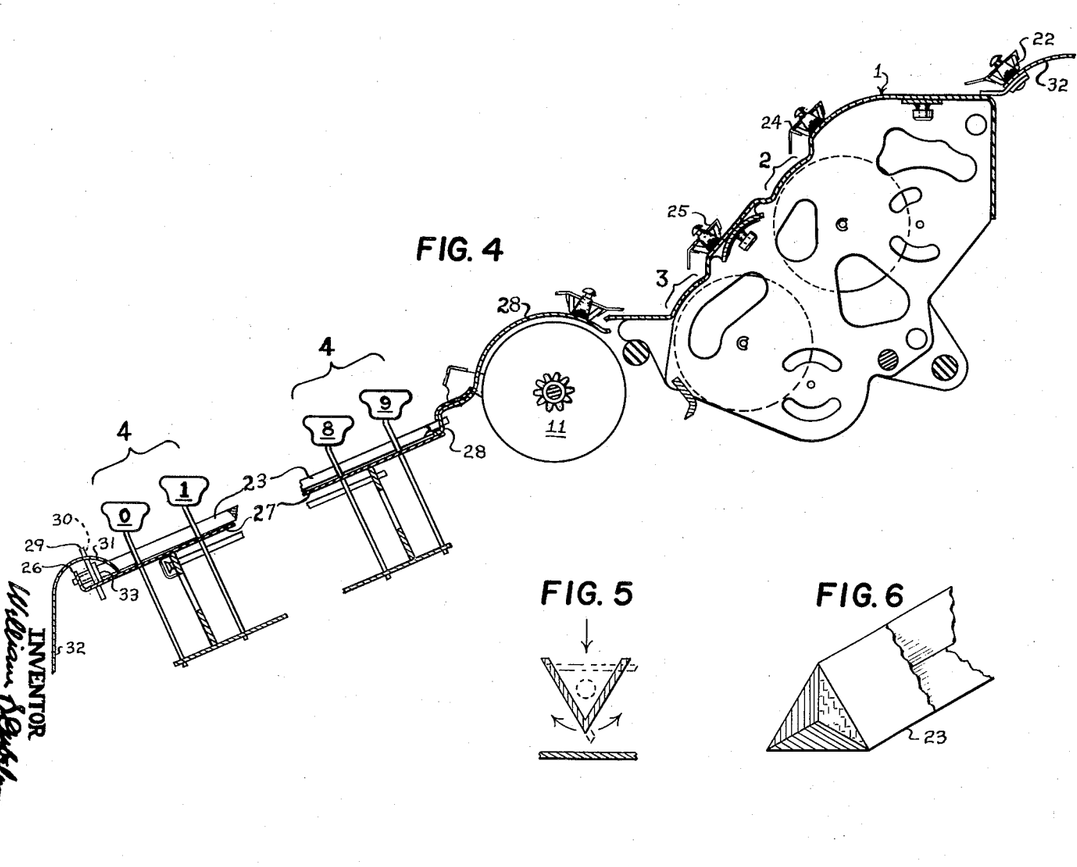
Figure 4 is a fragmentary sectional elevational view taken substantially on plane 4—4 of Figure 1, showing principally a keyboard decimal marker and the decimal pointers and rails therefor of the several carriage borne registers, with dials, and omitting other parts for clarity.
Figure 5 illustrates a cross sectional view of another marker bar construction.
Figure 6 is a perspective detail view in fragment of one form of composite marker bar for use in the machine.

Bars 23 may also be formed of multilateral strips of material, the strips being of individual color and secured together in any well known manner in such a way that one side of each strip forms a viewing face of a bar as may be seen in Fig. 6.

Figure 5 illustrates another form of marker bar construction which is substantially V-shaped in cross section, in which the various faces may be surfaced as desired for the purpose at hand; however, a preferred order of surfacing is by surfacing the faces forming the internal angle of the V to correspond to the keyboard background wall and by surfacing the external faces to contrast against the background wall, as discussed herein. The bar in phantom illustrates the bar in a contrasting face viewing position.

If, for example, the background color of plate 27 (Fig. 7) is green as indicated by the reference letter G, one face of each of the bars 23 (of which only three are shown) would also be green G and the other faces could be red and yellow, referred to respectively as R and Y. In practice a bar 23 will probably usually occupy the neutral or normal position as taken by the middle one of the bars shown, in which viewing position only the G face is visible to the operator. The right and left bars are shown in Figure 7 in their turned positions, in which each displays respectively only its R and Y face.

A bar 23 with more than one face being of mutually similar contrasting color or being of different contrasting colors will enable an operator to decimalize the keyboard by turning the bar in either direction from its normal position. Another advantage of bars with more than one face on each being of different colors is that the keyboard can be visually divided into two or more zones or sections by turning selected ones of the bars to display, for example, the same contrasting face Y, and then in each section or group the R face of a bar can be turned into view for decimalization or for further subdivision of the section or zone. This facilitates keeping of the several factors in simultaneous or parallel computations separated and to distinctly decimalize for each of the factors.

Detaining means 33, which may be preformed with turning means 29, is formed with surfaces 34 for frictionally engaging plate 27 to hold the respective bar 23 releasably in each of its three face viewing positions, the plate 27 being sufficiently resilient to allow this type of snap action. Positioning or detaining means 33 may also be formed with stop surface 35 to limit turning of the respective bar to an angular extent of less than 360°. When a bar 23 is in its normal position, stop surface 35 limits turning of the bar to one positioning step in either direction at which position one of the contrastingly surfaced faces of the bar is in view.

Figure 7:
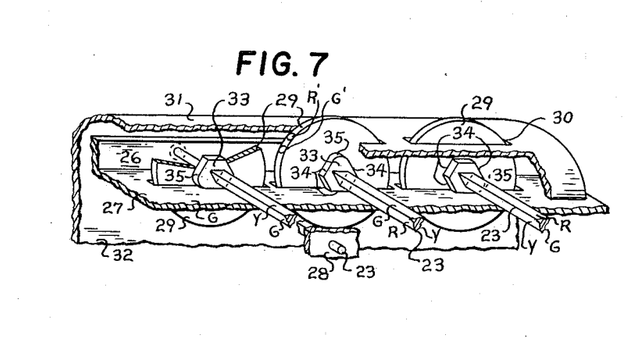
Figure 7 is a fragmentary partly broken out perspective view of one form of marker bars and supporting means including motion limiting means therefor.
Figure 8:
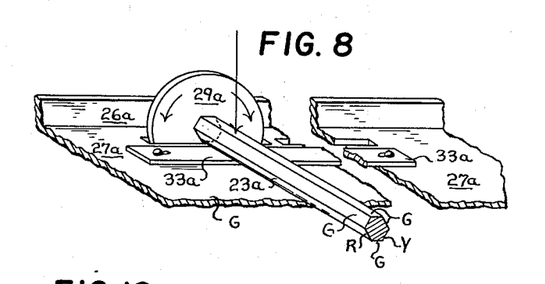
Figure 8 is a fragmentary perspective view showing another form of marker bar and supporting means, with position holding detent construction.

In Fig. 8 is shown a modified form of the arrangement illustrated in Fig. 7. In Fig. 8 the prismatic bars 23a which are shown by way of example only, as hexagonal in cross section, are provided with turning means 29a. Plate 27a is the background for the keyboard and may be surfaced in any desired way, but for explanatory purposes it will be assumed to be of a green color G. Of the six faces on each bar 23a, two alternate faces may be colored red and yellow, indicated as R and Y respectively, and four other faces are colored green G to match with the color of background 27a. The arrow at the top represents generally the line of vision of the operator. From this view it is clear that when the R face of a bar 23a is uppermost the operator sees only the predominating red color against the background of green. Similarly, on turning the bar 120° clockwise the operator sees only the predominating yellow face which is then uppermost. A further turning of the bar through 120° will confront the operator with a total green field as indicated, which signifies the absence of a decimal or other demarcation, the uppermost green colored faces having merged or blended with the color or background 27a. In this latter position, a bar is in its neutral or normal position and turning it through 120° or one step in either direction will bring a contrasting face into view. The detaining means shown by way of example comprises a strip member 33a formed of any suitable resilient or flexible material, for example rubber, rubber-like material, soft polyethylene plastic, cork, or leather, which is secured to plate 27a so as to releasably engage against the lower most faces of all bars 23a.

Figures 2, 3:
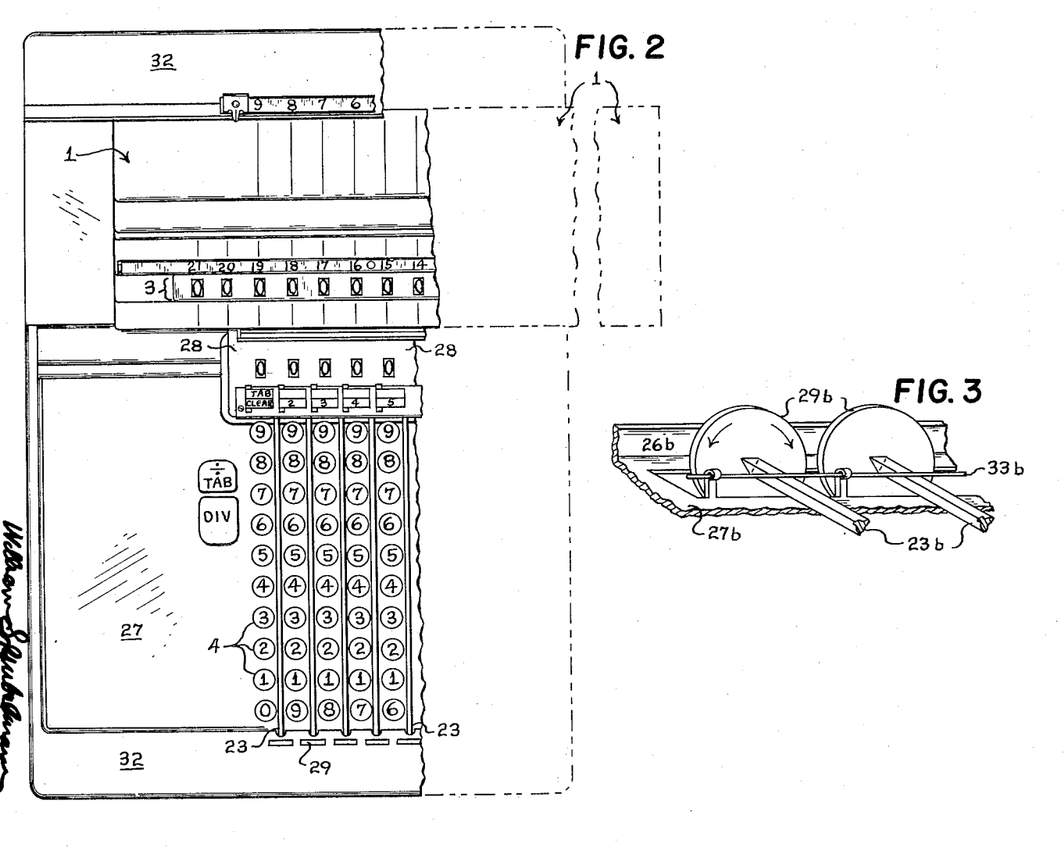
Figure 2 is a fragmentary top face view similar to that of Figure 1, but showing the carriage shifted all the way to the right.
Figure 3 is a fragmentary perspective view showing one form of turnable marker bar and detent means.

In Fig. 3 another modification of the detaining means is shown. This detaining means comprises a strip member or wire 33b formed of any suitable flexible resilient spring material which is secured to background plate 27b, preferably intermediate the prismatic marker bars 23b, so as to yieldably engage against the uppermost faces of all the bars. The triangular type bar is illustrated but the hexagonal or other shapes may also be utilized. Strip 33b is secured to the plate at spaced points by any known convenient method such as the clamping fingers which may be tongued out of plate 27b, intermediate the prismatic marker bars so as to permit strip 33b to flex sufficiently to effect release only of the bar being turned and of no other bar.

Figure 9:
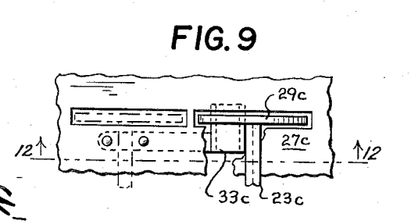
Figure 9 is a fragmentary top plan view of parts shown in Figure 12, and showing forms of marker bar and releasable positioning detent means associated therewith.
Figure 12:
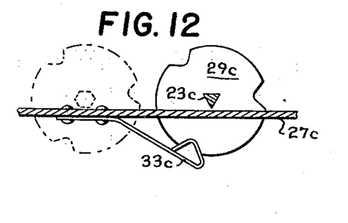
Figure 12 is a sectional elevational view taken substantially on plane 13—13 of Figure 9.

Still another modification of a detaining means is shown in Figs. 9 and 12. A detent 33c which may be formed of any suitable flexible resilient material, as for example, spring steel, is secured to plate 27c or any other convenient stationary member so as to ride the periphery of turning means 29c secured to each prismatic marker bar 23c of three or more longitudinal faces. The periphery of each turning means 29c is recessed at spaced points to receive the detent 33c so as to be held yieldingly thereby at each significant face viewing position of the respective bar 23c. Detaining means 33c may be used with triangular, hexagonal or more sided bars 23c.

Figures 10, 11:
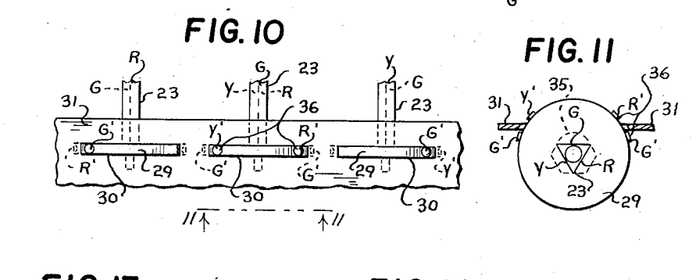
Figure 10 is a top plan view of parts seen in Figure 11, and showing a modified construction of marker bars and motion limiting means with position indicating means, the three bars being illustrated each with a different viewing face uppermost.
Figure 11 is a fragmentary sectional elevational view taken substantially on viewing plane 11—11 of Figure 10, the size of the marker bar, and the thickness of the indicia being exaggerated for clarity.

In order to facilitate selection of the direction in which to turn a marker bar 23, Fig. 10, to bring into viewing position a desired one of the out-of-view faces, direction guiding indicia 36 are provided on those portions of turning means 29 which are extensive through the frame openings or windows 30 in the overhanging cover wall 31 and are visible to the operator. The indicia may be bodies of colored or pigmented material or otherwise formed, corresponding to the colors of the bar faces and may be arranged as shown in Fig. 11 for those bars which are limited to a turn of less than 360°. For clarity the thickness of the indicia 36 has been exaggerated. The indicia may be raised or recessed as found advantageous, depending upon the particular use contemplated. The reference letters G', Y', and R' denote the color of each indicium as it corresponds with a bar face color of green G, yellow Y, and red R. The arrangement of indicia 36 is such that in each face viewing position of bar 23, the indicium representing the colored bar face which can be turned into view stands in close proximity to one of two lateral edges of frame or windows 30, Fig. 10, framing turning means 29. Such an indicium indicates or specifies the location around the bar of the then hidden represented colored face as being in the direction beyond the closest lateral edge of the frame. In Fig. 10, each of the three bars 23 shown is illustrated in a different face viewing position, the middle bar is in neutral position with its green face G in view, the left bar is turned to show its red face R and the right bar is displaying its yellow face Y. When a bar is in its neutral position the Y' indicium on the turning means stands near the left edge of window frame 30 and the R' indicium is situated near the right edge of the frame. This means that the Y bar face is to the left and the R bar face is to the right as if beyond the left and right edges respectively of the frame. Hence to bring the Y bar face into view the bar is turned clockwise and for displaying the R face it is turned counter-clockwise as viewed in Fig. 11. In the Y face position, as of the right most bar in Fig. 10, a further turning of the bar clockwise is not possible because of afore described stop element 35 as explained for Fig. 7, and the G face is beyond the right edge of the frame. Accordingly, no indicium is near the left edge, signifying that no bar face can be turned into view from that direction and the G' indicium near the right edge means that the bar can be turned counter-clockwise with the G face being the first to come into view. In a similar manner, when the R face of a bar is in view, as with the leftmost bar, there is no indicium near the right edge of the frame and a G' indicium is near the left, signifying respectively that further counter-clockwise turning is not possible and that a clockwise turn of one step will bring the G face into viewing position.

Figure 13:
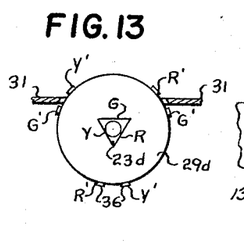
Figure 13 is a sectional elevational view taken substantially on plane 13—13 of Figure 14, the size of the marker bar and thickness of the indicia being exaggerated for clarity.
Figure 14:
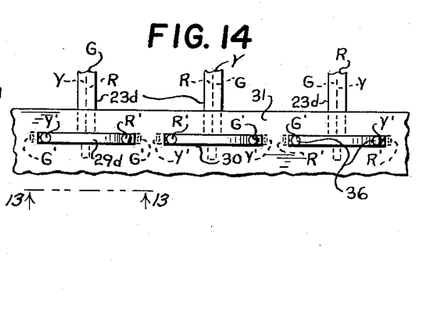
Figure 14 is a top plan view of parts seen in Figure 13, and showing a modified construction of marker bars with position indicating means, the three bars being illustrated each with a different viewing face uppermost.

Figs. 13 and 14 show one preferred arrangement of the indicia for prismatic bars 23d that are not limited in their turning. There are two indicia for representing each significant bar face. These indicia are so arranged that in each face viewing position of a bar two differently colored indicia are situated in close proximity to opposite lateral edges of frames or apertures 30 in cover wall 31 to indicate the location of the represented or correspondingly colored out-of-view bar faces as being in the direction beyond the closest end edge of the frame. The leftmost or first bar in Fig. 14 is shown in neutral position at which a Y' indicium on turning means 29d stands near the left frame edge and an R' indicium stands near the right edge, signifying respectively that a one step turn clockwise will bring the represented Y face into view, and that a one step turn counter-clockwise will bring the R face into viewing position. The second bar 23d is shown in its Y face position and the third or rightmost bar 23d is in its R face position. In the position of the second bar an R' and a G' indicium is near the left and right frame edge respectively, and in the position of the third bar a G' and a Y' indicium is situated near the left and right frame edge respectively. In each instance a one step turn clockwise as seen in Fig. 13 will bring into view that colored bar face which is rep-resented by the indicium near the left frame edge and similarly a one step turn counter-clockwise will bring into view that colored bar face which is represented by the indicium near the right frame edge.

Figure 15:
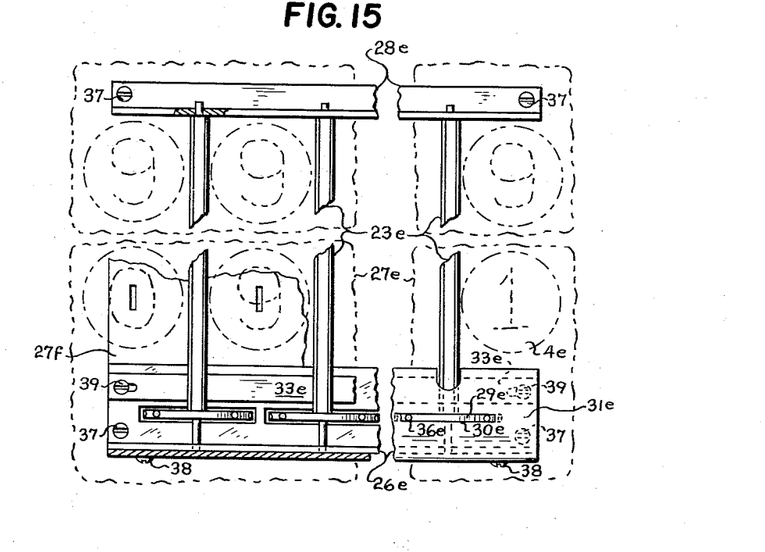
Figure 15 is a top plan view, partially sectioned, of the device shown in Figure 16, and illustrating a decimalizing assembly unit device, for use with any machine, and indicating in phantom keyboard portions of such a machine to which it can be attached.
Figure 16:
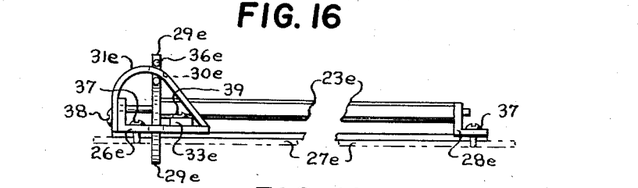
Figure 16 is a right side elevational view of the decimalizing assembly unit device shown in Figure 15, and indicating in phantom a machine part to which it may be attached.

Figures 15 and 16 illustrate one preferred form of a decimalizing or demarcating assembly unit which may be made separately for use in any machine to which it is adaptable. The unit includes turnable prismatic bars 23e, front and rear bar support means 26e and 28e, bar turning means 29e on each bar and a hood cover or wall member, 31e, all easily assembled as shown. Support means 26e and 28e which may be L shaped in cross section or some other convenient member may be adapted for mounting on any machine having a wall 27e or some other convenient member, as by screws 37. The support means are of sufficient length to have marker bars 23e journaled thereon so as to extend over such wall 27e intermediate the indicated adjacent banks of keys 4e of the machine. The bars or rods 23e shown are hexagonal in cross section but other multilateral types may be used. The longitudinal faces of bars 23e are constructed and arranged so that when one face of a bar is in a viewing position at least two of its other faces are out of view, the purposes and advantages of which have been explained hereinabove as for bars 23, 23a and the like in Figs. 7 and 8 respectively. One face of each bar 23e (Fig. 15) is surfaced to match the background surface such as 27e of the machine for which it is intended, or as 27f which may be a suitable overlay sheet provided with the assembly, the overlay sheet being secured to members 26e and 28e for supporting engagement therewith. At least two of the other faces that are out of view when the matching face is displayed may be surfaced mutually similarly but differently from the machine surface, or the two faces may be surfaced differently from each other and the machine surface. The forward or proximal end of each bar 23e has secured thereto turning means 29e for selectively turning the bar to display its matching or a contrasting face. Turning means 29e depend through suitable openings in support member 26e as seen on the left of Figure 16 and protrude upwardly through a frame opening or window 30e for each in hood wall 31e. This hood is secured to support means 26e by suitable fasteners 38 so as to prevent forward axial movement of the bars 23e. Rearward axial movement of the bars is blocked by support 28e. Hood 31e overlies support means 26e and the forward ends of the bars. Direction guiding indicia 36e, such as the afore-described indicia 36 in Figs. 10 and 11, or 13 and 14, may be arranged on the protrudable portions of turning means 29e. Each indicium 36e Fig. 16 on a turning means, marked or colored to relate to a particular surfaced face of the respective bar, will then be carried in proximity to one of the lateral edges of frame 30e when the related surfaced face is out of view whereby to signify the location of that surfaced face as being then in the direction around the bar beyond the closest frame edge. The position detaining means 33e illustrated is of the strip type formed of any suitable flexible resilient material, which is secured to support means 26e, as at 39, so as to releasably engage the lower most faces of all bars 23e. Support means 26e may be adapted to carry the afore-described position detaining means 33b as explained for Fig. 3, or both the support means 26e and turning means 29e may be adapted for detaining means such as 33c described previously for Figs. 9 and 12.

In the preceding, the preferred marker bar construction is disclosed as being relative to the length of the key banks between which it is to demarcate. One purpose for this, is to visibly present to an operator overall continuous delineation between each pair of corresponding keys in the adjacent banks. In another form, the marker bars may be of shorter construction in which form they will indicate linear demarcation substantially as set forth. For explanatory purposes the marker bars have been explained in connection with devices typified by computing machines with banks of digit keys or other selectively operable means. The marker bars, however, are of utility in other types of multiple selection machines, and are readily adaptable for use in machines in which the selectively operable means or key elements are otherwise arranged, for example, in side by side serial relationship. In such cases, each marker bar 23g (Fig. 18) may be structurally modified, as by adopting a shorter length along its longitudinal axis which is the axis about which it is turnable. The bars being made of a length and otherwise dimensioned for suitable disposition in desired accommodating areas in proximity to the key elements, to permit differential changeable delineation or grouping thereof. Such marker bars may be provided with turnable mounting arrangements at one or the other of their ends, which ever is suitable or advantageous, or at both ends as explained hereinbefore. As illustrated, 4g represents selective key elements, 27g represents the frame or background wall for keys 4g, which carries flange element 26g on which markers 23g are turnably mounted at one end, and 29g represents turning means secured to bars 23g for turning the same.

Figure 17:
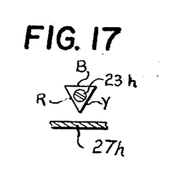
Figure 17 is an elevational view of a marker bar construction illustrating differential surfacing.
Figure 18:
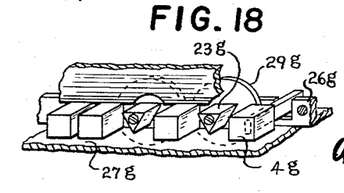
Figure 18 is a fragmentary perspective view of a machine showing modified construction of selectively operable means and demarcating elements thereof.

The marker bars 23g as seen in one form in Figure 18 may be constructed with surfacing on their longitudinal faces as already described for marker bars hereinbefore. In another form (Fig. 17) the three significant viewing longitudinal faces may be all surfaced differently from each other and from a wall 27h which may be provided or adopted as the background wall, to permit differential demarcation or grouping of the key elements, as desired. By turning one or more markers 23h to bring into view a similarly surfaced face on each bar, indication may be given of the presence of demarcation or grouping of the key elements or absence of demarcation depending upon the pattern of operative usage adopted.

What I claim is:

1. In a calculating machine in which there is a plurality of banks of keys, a wall formed of yieldable resilient material and forming a background for said keys, a plurality of elongated marker bars having more than two longitudinal faces on each bar, each bar extending over said wall between adjacent banks of keys and being mounted for turning about its longitudinal axis for bringing into a viewing position selectively any one of its faces, said bars being formed with angularly inclined longitudinal faces so that when any one of said faces of a bar is displayed, at least two of its other said faces are out of view, at least one face of each bar being of a surface corresponding to the surface of the background wall, the faces that are out of view with respect to said corresponding face on each bar being of a surface different from that of said background wall, whereby when a bar is turned to display its said corresponding face, it blends with said background wall to become substantially indiscernible, and when said bar is turned to display any one of its said differently surfaced faces over said background wall, it contrasts there-against, distinctly delineating the adjacent banks of keys, and positioning means mounted on each said bar for turning therewith and formed with a plurality of step edges, each relating to and parallel with a different one of the faces of said bar, said step edges being frictionally engageable against said background wall to releasably hold said bar with any related face in viewing position, and stop limit means carried by said positioning means for rotary movement therewith and projecting radially further than any said step edge for stop contact with said wall to arrest said bar upon turning of said bar by only one face exhibiting step in any direction from said corresponding face viewing position, to expose a differently surfaced face, whereby, when a differently surfaced face is exposed, the bar must be first turned to the correspondingly surfaced face position, before it can be turned to the other differently surfaced face position.

2. In a calculating machine in which there is a plurality of banks of keys, a wall formed of yieldable resilient material and forming a background for said keys, a plurality of elongated marker bars having more than two longitudinal faces on each bar, each bar extending over said wall between adjacent banks of keys and being mounted for turning about its longitudinal axis for bringing into a viewing position selectively any one of its faces, said bars being formed with angularly inclined longitudinal faces so that when any one of said faces of a bar is displayed, at least two of its other said faces are out of view, at least one face of each bar being of a surface corresponding to the surface of the background wall, the faces that are out of view with respect to said corresponding surface on each bar being of a surface different from that of said background wall, whereby when a bar is turned to display its said corresponding surface, it blends with said background wall to become substantially indiscernible, and when said bar is turned to display any one of its said different surfaces over said background wall, it contrasts thereagainst, distinctly delineating the adjacent banks of keys, turning means carried by each of said bars for turning the same, and positioning means carried by said turning means for rotary movement therewith, said positioning means comprising a plurality of wall engaging surfaces, each relating to and parallel with a different one of said bar faces, for frictional engagement of any of said engaging surfaces with said wall for positioning the related said bar to present to view selectively and predetermined bar face.

3. In a calculating machine in which there is a plurality of banks of keys, a wall formed of yieldable resilient material and forming a background for said keys, a plurality of elongated marker bars having more than two longitudinal faces on each bar, each bar extending over said wall between adjacent banks of keys and being mounted for turning about its longitudinal axis for bringing into a viewing position selectively any one of its faces, said bars being formed with mutually angularly inclined longitudinal faces so that when any one of said faces of a bar is displayed, at least two of its other said faces are out of view, at least one face of each bar being of a surface corresponding to the surface of the background wall, the faces that are out of view with respect to said corresponding face on each bar being of a surface different from that of said background wall, whereby when a bar is turned to display its said corresponding face, it blends with said background wall to become substantially indiscernible, and when said bar is turned to display any one of its said different faces over said background wall, it contrasts thereagainst, distinctly delineating the adjacent banks of keys, turning means carried by each of said bars for turning the same, and bar face positioning means carried by each of said bars for turning therewith and with said turning means, and comprising a plurality of wall engaging surfaces, at least one of each said wall engaging surfaces relating to a different bar face of its related bar and parallel thereto for frictional engagement of any of said wall engaging surfaces with said yieldable background wall which yields to permit turning of said positioning means for positioning each bar to present to view selectively any predetermined bar face, said positioning means comprising radially extended stop means for positive stop engagement with said background wall for limiting turning of each bar to a predetermined angular extent in any one turning direction, whereupon one of said different surfaced bar faces is presented in viewing position.

4. In a calculating machine in which there is a plurality of banks of keys, a wall formed of yieldable resilient material and forming a background for said keys, a plurality of elongated marker bars having more than two longitudinal faces on each bar, each bar extending over said wall between adjacent banks of keys and being mounted for turning about its longitudinal axis for bringing into viewing position selectively any one of its faces, said bars being triangular in cross-section with first, second and third said faces so that when any one of said faces of a bar is displayed parallel to said background wall and thus in viewing position, its other faces are out of view, said second face of each bar being of a surface corresponding to the surface of the background wall, said first and third faces surfaced different from said background wall, whereby when a bar is turned to display its said second face, it blends with said background wall to become substantially indiscernible, and when said bar is turned to display one of its said first and third faces over said background wall, it contrasts thereagainst, distinctly delineating the adjacent banks of keys, turning means carried by each of said bars for turning the same, and bar face positioning means carried by each of said bars for turning therewith and with said turning means, and comprising first, second and third wall engaging surfaces each relating respectively to a different bar face of its related bar and parallel thereto for frictional engagement of any of said wall engaging surfaces with said yieldable background wall which yields to permit stepwise turning of said positioning means therepast for positioning each bar to present to view selectively any predetermined bar face, said positioning means comprising radially extended stop means for positive stop engagement with said background wall for limiting turning of each bar to a predetermined angular extent in any one turning direction, whereupon one of said first and third bar faces is presented in viewing position.

5. In a calculating machine in which there is a plurality of banks of keys, a surfaced wall forming a background for said keys, flanged end bracket means on said wall, a plurality of elongated marker bars having more than two longitudinal faces on each bar, each bar extending over said wall between adjacent banks of keys and being mounted on said flanged end bracket means for turning about its longitudinal axis for bringing into a viewing position selectively any one of its faces, said bars being formed with end shoulders so engaging said flanged end bracket means as to block endwise movement of said bars, said bars being formed with mutually angularly inclined longitudinal faces so that when any one of said faces of a bar is displayed, at least two of its other said faces are out of view, at least one face of each bar being of a surface corresponding to the surface of the background wall, the faces that are out of view with respect to said corresponding surface on each bar being surfaced differently from that of said background wall, whereby when a bar is turned to a position for display of its said corresponding surface, it blends with said background wall to become substantially indiscernible, and when said bar is turned to display any one of its said different surfaces over said background wall, it contrasts against said wall, distinctly delineating the said adjacent banks of keys, a frame having a plurality of spaced apertures of limited area and with first and second oppositely located limit edges, turning means for each bar for turning the bar and protruding through said apertures in said frame so that at least some portion of said turning means is turnably extensive therethrough and visible outwardly of said frame, and a plurality of face projection means supported on said protrudable portions of said turning means and movable therewith, through said frame apertures and into said outwardly exposed positions sequentially upon turning of said turning means, each of said face projection means corresponding to a different bar face and being located angularly relative thereto, so that when said bar face is turned to viewing position its said corresponding face projection means is located out of registry with said frame aperture, and so that when its said bar face is turned to an out of view position, at which position it is nearest to said first limit edge, said corresponding face projection means is in registry with said aperture and immediately adjacent said first limit edge.

6. In a calculating machine in which there is a plurality of banks of keys, a surface wall forming a background for said keys, flanged end bracket means on said wall, a plurality of elongated marker bars, each bar extending over said wall between adjacent banks of keys and being mounted on said flanged end bracket means for rotary movement about its longitudinal axis, and being formed with end shoulders engaging said flanged end bracket means to block endwise movement of said bar, each said bar being formed with first, second and third longitudinal faces, each face being brought into a viewing position selectively by turning of said bar, said faces being mutually angularly inclined so that when any one of said faces of a bar is displayed, its other said faces are out of view, said first face of each bar being of a surface matching the surface of the background wall, said second face being of a surface different from that of said background wall, and said third face being of a surface different from said first face and said second face, whereby when a bar is turned to display its matching said first face, it blends with said background wall to become substantially indiscernible, and when said bar is turned to display any one of its said different surfaced second and third faces over said background wall, it contrasts with said wall, distinctly delineating the respective adjacent banks of keys, a frame having a plurality of spaced apertures of limited area and with first and second oppositely located limit edges, turning means coaxial with each of said bars for turning the same about its axis and protruding radially through said apertures in said frame so that at least some portion radially spaced from the axis of said turning means is always extensive outwardly through said apertures, a plurality of bar face projection means supported in spaced array on said protrudable portions of said turning means and movable therewith through said frame aperture and into said outwardly exposed positions sequentially upon turning of said turning means, there being at least two of said projection means for and related to each of said surfaced faces of said bar and these being located on a chord parallel to their said related bar face, so that when said first bar face is in viewing position, both of its said related face projection means are out of registry with said aperture and immediately behind said first and second aperture limit edges respectively, and, said second bar face being in out of view position and nearest said second limit edge, its second face projection means is out of registry with said aperture and its first face projection means is in registry with said aperture and immediately adjacent said second limit edge, and, said third bar face being in out of view position and nearest said first limit edge, its said first face projection means is out of registry with said aperture, and its said second face projection means is in registry with said aperture and immediately adjacent said first limit edge thereof.

7. In a calculating machine in which there is a plurality of banks of keys, a surfaced wall formed of yieldable resilient material and forming a background for said keys, flanged end bracket means on said wall, a plurality of elongated marker bars, each bar extending over said wall between adjacent banks of keys and being mounted on said flanged end bracket means for turning about its longitudinal axis for bringing into viewing position selectively any one of its faces, said bars being formed with end shoulders so engaging said flanged end bracket means as to block endwise movement of said bars, said bars being triangular in cross-section with first, second and third mutually angulularly inclined longitudinal surfaced faces so that when any one of said faces is displayed parallel to said background wall and thus in viewing position, its other faces are out of view, said first face of each bar being surfaced like the surface of the background wall, said second and third faces being surfaced differently from said background wall and differently from each other, whereby, when a bar is turned to display its said first face it corresponds with said background wall, and when said bar is turned to display one of its said second and third faces, it differs from said background wall, distinctly delineating between adjacent banks of keys, a frame formed with a plurality of spaced apertures of limited area and with first and second oppositely located limit edges, turning means carried by each of said bars for turning the same and protruding radially through said apertures in said frame so that at least some portion radially spaced from the axis of said turning means is always extensive outwardly through said apertures, bar face positioning means carried by each of said bars for turning therewith and with said turning means, and comprising first, second and third wall engaging surfaces each relating respectively to a different bar face of its related bar and parallel thereto for frictional engagement of any of said wall engaging surfaces with said yieldable background wall, which yields upon stepwise turning of said positioning means therepast, for positioning each bar to present to view selectively any predetermined bar face, said positioning means comprising radially extended stop means for positive stop engagement with said background wall for limiting turning of each bar to a predetermined angular extent in any one turning direction, whereupon one of said second and third bar faces is presented in viewing position, and a plurality of bar face projection means supported in spaced array on said protrudable portions of said turning means and movable therewith through said frame apertures and into said outwardly exposed positions sequentially upon turning of said turning means, there being two projection means individual to and for said first bar face, and a different projection means individual to and for each said second and third bar faces, each projection means being disposed angularly relative to its related bar face so that when a bar face is displayed, its related projection means is out of registery with said aperture, and so that when a bar face is in an out of view position immediately behind a particular limit edge, its related projection means is in registry with said aperture adjacent said particular limit edge.

8. In a calculating machine in which there is a plurality of banks of keys, a surfaced wall formed of yieldable resilient material and forming a background for said keys, flanged end bracket means on said wall, a plurality of elongated marker bars, each bar extending over said wall between adjacent banks of keys and being mounted on said flanged end bracket means for turning about its longitudinal axis for bringing into viewing position selectively any one of its faces, said bars being formed with end shoulders so engaging said flanged end bracket means as to block endwise movement of said bars, said bars being triangular in cross-section with first, second and third mutually angularly inclined longitudinal surfaced faces so that when any one of said faces is displayed parallel to said background wall and thus in viewing position, its other faces are out of view, said first face of each bar being surfaced like the surface of the background wall, said second and third faces being surfaced differently from said background wall and differently from each other, whereby, when a bar is turned to display its said first face it corresponds with said background wall, and when said bar is turned to display one of its said second and third faces, it differs from said background wall, distinctly delineating between adjacent banks of keys, a frame formed with a plurality of spaced apertures of limited area and with first and second oppositely located limit edges, turning means carried by each of said bars for turning the same and protruding radially through said apertures in said frame so that at least some portion radially spaced from the axis of said turning means is always extensive outwardly through said apertures, bar face positioning means carried by each of said bars for turning therewith and with said turning means, and comprising first, second and third wall engaging surfaces each relating respectively to a different bar face of its related bar and parallel thereto for frictional engagement of any of said wall engaging surfaces with said yieldable background wall, which yields upon stepwise turning of said positioning means therepast, for positioning each bar to present to view selectively any predetermined bar face, said positioning means comprising radially extended stop means for positive stop engagement with said background wall for limiting turning of each bar to a predetermined angular extent in any one turning direction, whereupon one of said second and third bar faces is presented in viewing position, and a plurality of bar face projection means supported in spaced array on said protrudable portions of said turning means and movable therewith through said frame apertures and into said outwardly exposed positions sequentially upon turning of said turning means, there being two of said projection means for and related to said first surfaced face of said bar and one of said projection means for and related to said second face and one of said projection means for and related to said third face of said bar, all of these projection means being located on chords respectively parallel to their said related bar face, and so that when said first bar face is in viewing position, both of its said related face projection means are out of registry with said aperture and immediately behind said first and second aperture limit edges, and, said second bar face being in an out of view position and nearest said second limit edge, its face projection means is in registry with said aperture and immediately adjacent said second limit edge, and, said third bar face being in an out of view position and nearest said first limit edge, its said projection means is in registry with said aperture and immediately adjacent said first limit edge thereof and, when said bar is turned from its said first face displaying position to display one of its said second and third faces, said bar is stopped and is not turnable therebeyond and one of said first bar face projection means is in registry with said aperture near the limit edge thereof closest to the then out of view said first bar face.

9. A decimalizing and demarcating device comprising an elongated first end support bracket means including a flange, a second elongated end support bracket means including a flange and a base of yieldable resilient material, a plurality of elongated marker bars extending mutually parallel to each other in spaced array and journaled at their ends in said flanges for being supported therebetween for movement only each about its own axis, angularly oriented first, second and third elongated viewing faces on each bar, said first face being distinctly surfaced, and said other bar faces being differently surfaced therefrom, a turning means mounted on each of said bars for turning the same, bar face positioning means carried by each of said bars for turning therewith and with said turning means and comprising a plurality of base engaging surfaces, at least one of each of said base engaging surfaces relating to a different bar face of its related bar, and parallel thereto for frictional engagement of any of said base engaging surfaces with said yieldable bracket base, which resiliently yields upon turning of said positioning means for positioning each bar to present to view selectively any predetermined bar face.

10. A marking and demarcating device comprising an elongated first end support bracket means including a flange, a second elongated end support bracket means including a flange and a base of resilient yieldable material, a plurality of elongated marker bars extending mutually parallel to each other in spaced array and journaled at their ends in said end support bracket means flanges for being supported therebetween for movement only each about its own axis, angularly oriented first, second and third elongated viewing faces on each bar, said first face being distinctly surfaced, and said other bar faces being differently surfaced from each other and from said first viewing face, a turning means mounted on each of said bars for turning the same, bar face positioning means carried by each of said bars for turning therewith and with said turning means, and comprising a plurality of base engaging surfaces, at least one of each of said base engaging surfaces relating to a different bar face of its related bar, and parallel thereto, for frictional engagement of any of said base engaging surfaces with said yieldable bracket means base, which yields to permit turning of said positioning means for positioning each bar to present to view selectively any predetermined bar face, said positioning means comprising substantially radially extended stop projection means for positive stop engagement with said yieldable resilient bracket base so as to block further turning of each bar therepast, and thereby for limiting turning of each bar to a predetermined angular extent in any one turning direction, whereupon one of said second or third differently surfaced bar faces is presented in viewing position, and whereby when all said marker bars exhibit similarly surfaced faces, distinction among said bars is excluded, and when any marker bar exhibits a surfaced face dissimilar thereamong, demarcation exists, and whereby a variety of patterns of marking and demarcation are presentable as desired upon exhibition of differently surfaced faces of said marker bars.

11. A demarcating device for decimalizing, sub-dividing and other operations in machines employing a plurality of banks of digit keys with a background wall therefor, said device being a unitary assembly accessory and comprising a plurality of elongated marker bar means for disposition between adjacent banks of keys, each marker bar means being reduced at its ends to form shoulder means with trunnions extending there-beyond, first and second bar support means each comprising a base flange for mounting on said machine, and an upstanding flange with said trunnions journaled therein for pivotally supporting said marker bar means with said marker bar means extending over said background wall, said upstanding flanges closely engaging said marker bar means at said shoulder means thereof to block said marker bar means against endwise movement, background layer means for providing a background for said marker bar means, and for supporting engagement with the base flanges of said bar support means and for presenting to view a viewing surface, each marker bar means being triangular in cross section with first, second and third longitudinal bar faces, so that when one face is presented to view the other faces are out of view, said first bar face being surfaced like said layer means to exclude demarcation and said second and third faces being surfaced differently from said layer means to effect delineation between said key banks when presented to view, a hood wall carried by said first support means and extending over the proximal end of each marker bar means, an aperture relative each bar means formed on said hood wall with first and second limit edges, turning means carried by each bar for turning therewith for bringing into viewing position selectively any one of its said bar faces, each turning means protruding through its related said aperture so that at least some portion of said turning means is always turnably extensive outwardly therethrough relative said limit edges, and a plurality of bar face projection means supported in spaced array on said protruding portions of each said turning means and movable therewith through said aperture into said outwardly exposed positions sequentially upon turning of said turning means, there being at least one projection means individual to each bar face and relating thereto, each projection means being displaced angularly relative to its related bar face so that when a bar face is in viewing position its related projection means is out of registry with said aperture and said projection means relating to the out of view bar faces are in registry with said aperture, each adjacent that limit edge immediately behind which the related bar face is out of view.

References Cited in the file of this patent
UNITED STATES PATENTS

| | | |
|---|---|---|
| 369,193 | Longacre | Aug. 30, 1887 |
| 974,937 | Wales | Nov. 8, 1910 |
| 1,484,852 | Triebel | Feb. 26, 1924 |
| 1,580,858 | Schluns | Apr. 13, 1926 |
| 1,627,208 | Slayton | May 3, 1927 |
| 2,329,180 | Boyd | Sept. 14, 1943 |
| 2,365,735 | Ware | Dec. 26, 1944 |
| 2,521,104 | Welch | Sept. 5, 1950 |
| 2,651,632 | Machado | Oct. 28, 1952 |

FOREIGN PATENTS

| | | |
|---|---|---|
| 401,412 | Germany | Sept. 4, 1924 |
| 573,154 | Germany | Mar. 28, 1933 |
| 482,074 | Italy | June 18, 1953 |
| 78,432 | Switzerland | Jan. 2, 1919 |
| 272,314 | Switzerland | Dec. 15, 1950 |